United States Patent [19]

Genuist et al.

[11] 3,848,253

[45] Nov. 12, 1974

[54] SIDE LOOKING PULSE RADAR SYSTEM

[75] Inventors: Jean Genuist; Guy Le Parquier, Paris, France

[73] Assignee: Thomson-CSF, Paris, France

[22] Filed: June 13, 1972

[21] Appl. No.: 262,370

Related U.S. Application Data

[63] Continuation-in-part of Ser. No. 831,284, June 6, 1966, abandoned.

[30] Foreign Application Priority Data

June 18, 1968 France .......................... 68.155437

[52] U.S. Cl............. 343/5 CM, 343/7.7, 343/16 M
[51] Int. Cl. ........................... G01s 3/52, G01s 9/42
[58] Field of Search.... 343/5 CM, 7.7, 16 M, 16 LS

[56] References Cited
UNITED STATES PATENTS

| | | | |
|---|---|---|---|
| 3,007,155 | 10/1961 | Petrides | 343/5 CM |
| 3,271,765 | 9/1966 | Pulford | 343/5 CM |
| 3,438,030 | 4/1969 | Dickey, Jr. | 343/7.7 |
| 3,441,930 | 4/1969 | D'Obrennan et al. | 343/7.7 |

*Primary Examiner*—Malcolm F. Hubler
*Attorney, Agent, or Firm*—Cushman, Darby & Cushman

[57] ABSTRACT

A moving side looking coherent pulse radar system in which the transmission and the reception steps are carried out with the same radiation pattern of the "difference type", i.e. formed from two main lobes symmetrical with each other with respect to a plane, the plane being here normal to the trajectory of the radar carrier and having a nil gain in this plane.

As a consequence of the radiation pattern used, conventional coherent detector and narrow filtering means in the receiver stage supply echo signals corresponding to moving targets instead of the stationary targets as in conventional systems in which the radiation pattern is of the sum type.

4 Claims, 4 Drawing Figures

SIDE LOOKING PULSE RADAR SYSTEM

This application is a continuation-in-part of the application Ser. No. 831,284 filed June 6, 1966 by the Applicant Guy LE PARQUIER et al., now abandoned.

This invention has for its object a side-looking coherent pulse radar system operating as a M.T.I. system.

It is recalled that the term coherent is applied to radar systems in which the useful received echoes originate from pulses obtained by pulse modulating a continuous wave, or wherein each echo is phase detected with respect to a reference wave in phase with the carrier of the pulse from which the considered echo originates.

It is also recalled that in side looking carried radar systems the main radioelectric axis of the radiation pattern of the antenna system is directed perpendicularly to the direction of displacement of the radar system carrier.

In known systems of this type, the radiation pattern of the antenna system, both for the emission and the reception, is generally formed by only a symmetrical directive lobe, the gain of which is maximum along the symmetry axis, which in this case is also the said radioelectric axis, such as for example the "sum" diagram of the antenna system of a conventional amplitude monopulse radar system. The processing of the echoes is then based on the determination of the instant when the Doppler frequency of a given target goes through zero at this instant; the target, which either is stationary or moves parallel to the displacement of the carrier, is located exactly on the radioelectric axis. Such systems are useful for providing the visualisation of coasts, mountains, and more generally of any fixed target.

On the contrary the present invention has for its object the visualisation of the moving targets.

It is to be noted that the terms "stationary" and "moving", when not further qualified, are related to the ground and not to the aircraft.

According to the invention, there is provided a side looking radar system for a moving body, exploring the space laterally with respect to the displacement direction of said body, comprising transmitting means, receiving means including coherent detection means having a reference input and an output, means for supplying a reference wave to said input and narrow band filtering means coupled to said output, said system further comprising aerial means coupled to said transmitting and receiving means, said aerial means having a main radiation pattern comprising two main lobes symmetrical with each other with respect to a plane, which is substantially normal at any instant to said displacement direction, and having a nil gain along said plane.

For a better understanding of the invention and to show how the same may be carried into effect, reference will be made to the drawings accompanying the following description and in which.

Figure 1:
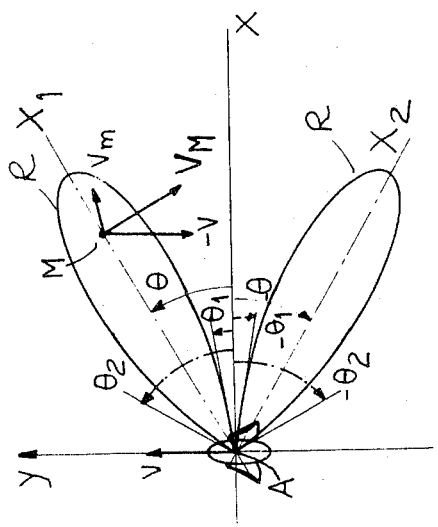
FIG. 1 shows the radiation pattern of the radar system according to the invention.
Figure 2:
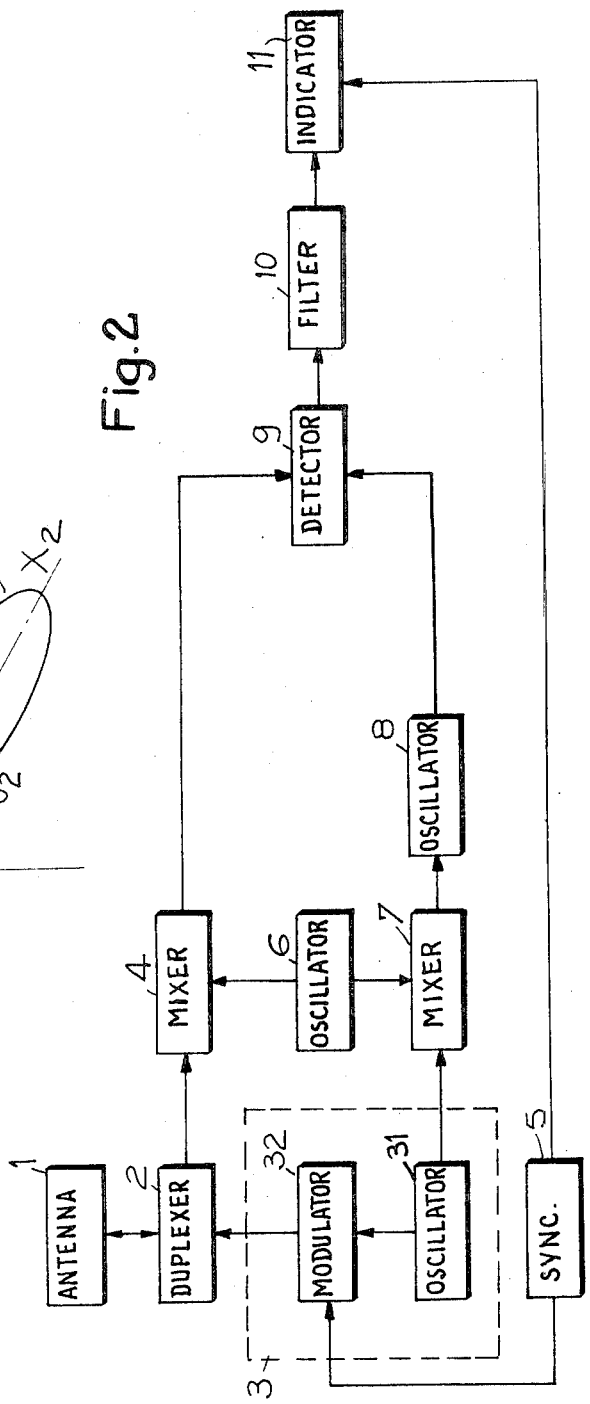
FIG. 2 is a basic diagram of a radar system according to the invention for eliminating fixed echos.

In FIG. 1, AX is the radioelectric axis of the side looking radar system carried by the aircraft A, AY representing the flight path or displacement direction. According to the invention, this coherent-pulse radar system as shown in FIG. 2 comprises an antenna 1 whose radiation pattern, denoted by the reference R in FIG. 1, is symmetrical with respect to the axis AX and has a nil gain along this axis. The antenna used is preferably a monopulse antenna fed by its difference channel $\Delta$. A duplexer 2 couples this channel alternately to the transmitter 3 and to the receiver mixer 4. The transmitter 3 essentially comprises an oscillator 31 and a pulse modulator 32 unblocked by the synchronization system 5. On the other hand, the mixer stage 4 receives the wave of the local oscillator 6 which is also mixed at 7 with that of the transmitter oscillator to ensure the coherence of the oscillator 8 which supplies the wave applied as a reference to the phase detector 9 arranged at the output of the mixer stage 4.

This description corresponds to the case of transmitted pulses supplied by a magnetron. However, it should be understood that, in the case of transmitted pulses chopped from a continuous stable wave, the oscillator 8 may be dispensed with, the mixer 7 supplying directly the coherent reference wave.

In order not to overload the FIG., the various amplification stages required for high-frequency and medium-frequency transmission and reception, being completely conventional, have not been shown.

A low-pass filter with a narrow band width 10 placed at the output of the detector allows through it only those signals, the Doppler frequency of which is substantially zero.

The conventional processing unit or indicator 11, in the form of a photographic screen or film, is placed at the output of the filter.

The velocity of a target relative to the antenna of the radar system can be resolved into two components one of which lies along an imaginary line drawn between the target and the antenna and the other of which is perpendicular to this line. The component which lies along the said line will be called the "relative radial velocity" and it is the value of this relative radial velocity which determines the amount of Doppler frequency shift undergone by a signal which leaves the antenna and then returns to the antenna after being reflected from the target. If the value of the relative radial velocity is zero, i.e. if, in relation to the antenna, the target is apparently moving in a direction which is prependicular to the line drawn between the target and the antenna, there will be no Doppler frequency shift. In known side-looking radar systems, the radiation pattern of the antenna comprises a main lobe having a maximum gain in a direction perpendicular to the direction of movement of the vehicle carrying the radar system. Thus, in FIG. 1, this main lobe would lie along AX, the flight path of the aircraft being as it is AY. Remembering that, for zero Doppler frequency shift, the target should have a relative radial velocity equal to zero, it will be seen that the known side-looking radar systems will detect targets which, as far as the aircraft A is concerned, are apparently moving in a direction perpendicular to AX. Thus, these known systems detect targets which are on the line AX and which are either moving in a direction parallel to AY or which are fixed.

This is explained in more details, for example in the U.S. Pat. No. 3,569,967. Therefore, in conventional sidelooking radar systems, there is no available criterion of the fact that a target is moving and it can only be ascertained that certain targets are not moving; and this is true, no matters whether the conventional radar radiates a main lobe on one or either side of the body as shown in the U.S. Pat. No. 3,438,030.

The present invention avoids this drawback. In the system according to the invention, a zero Doppler frequency can be obtained only if the target is moving. This results from the fact that, in a side-looking radar system according to the invention, the radiation pattern is nil in the vertical plane comprising AX.

It should be noted that in any combination of known radar systems, for example of those described in the U.S. Pat. Nos. 3,441,930 and 3,438,030, the radiation pattern has a maximum gain in said plane, and consequently, the Doppler frequency cannot be nil when the target is moving.

In the radar system according to this invention, the antenna is able to produce a radiation pattern which has zero gain along AX but which has two main lobes R as shown in FIG. 1. These lobes have maximum gains along the lines $AX_1$ and $AX_2$. In this radar system, a target which is lying within one of the lobes R and which is fixed or is moving parallel to the aircraft A is not detected because its relative radial velocity, i.e. the component of the relative velocity along a line drawn between the target and the aircraft (for example the line $AX_1$), is not zero. If the aircraft A were travelling past a fixed target, then while the target is within one of the lobes R, its relative radial velocity would vary over a range of values which are all greater than zero for the upper lobe in FIG. 1, and which are all less than zero for the lower lobe. The two boundary values of each range of relative radial velocity values will depend upon the respective angles between the line AX and a line drawn between the target and the aircraft when the target enters the corresponding lobe, and when the target leaves this lobe. The maximum ranges of values are traversed when the target is very close to the aircraft because here the relevant angles are the angles $\pm \theta_1$ and $\pm \theta_2$ between the line AX and the tangents at the origins of the lobes. These maximum ranges will be between $|\vec{V} \sin \theta_1|$ and $|\vec{V} \sin \theta_2|$ where $\vec{V}$ is the speed of the aircraft, i.e. its velocity relative to the ground. Thus, it will be seen that the relative radial velocity of the fixed target can not become less than $V \sin \theta_1$ while the target is within one of the lobes ($\theta_1$ being smaller than $\theta_2$). On the other hand, if the target were moving, its velocity being comprised within a particular range of magnitude and directions, then as it passes through the lobes R, its relative radial velocity will at somme point become zero. For example in FIG. 1 there is within one of the lobes a target M which is moving with a velocity $\vec{V}_m$. For the sake of simplicity in FIG. 1, the target M is represented at the instant at which it is located on the axis $AX_1$ of the lobe. Its velocity with relation to the radar system carried by the aircraft A, is the resultant $\vec{V}_M$ of the two compents $\vec{V}_m$ and $-\vec{V}$. To each of those components there corresponds a radial velocity component which is the projection on the direction AM of the corresponding component, $\vec{V}_m$ or $-\vec{V}$, considered. It will be seen that, when the direction AM is perpendicular to the direction of the resultant $\vec{V}_M$, those radial velocity components are qqual and opposite and the relative radial velocity of the target becomes zero. In that position, the target will be detected by the radar system carried by the aircraft A. Accordingly, it is only the echos of some moving targets which produce a signal at the output of the filter 10 in FIG. 2.

Any moving target will, at some position thereof, have zero radial velocity in relation to the aircraft unless it is moving along the same line as the aircraft. However, for some of these targets, the relevant "position" will not be within one of the lobes. As a general rule, a target will be detected by the radar system of FIG. 2 if the position of the target, at a time when that component of its velocity in relation to the radar system which lies along a line drawn between the target and the aircraft is zero, is within one of the lobes R.

Thus, the fixed echos are eliminated: these which are located within one of the lobes have Doppler frequencies $f_d = 2v \sin \theta/\lambda$ and are eliminated by the filter 10, while those along the axis AX which have a zero Doppler frequency are not processed because their level is too low, the gain in this direction being nil or very weak (from 20 to 25 db below the maximum gain).

Figure 3:
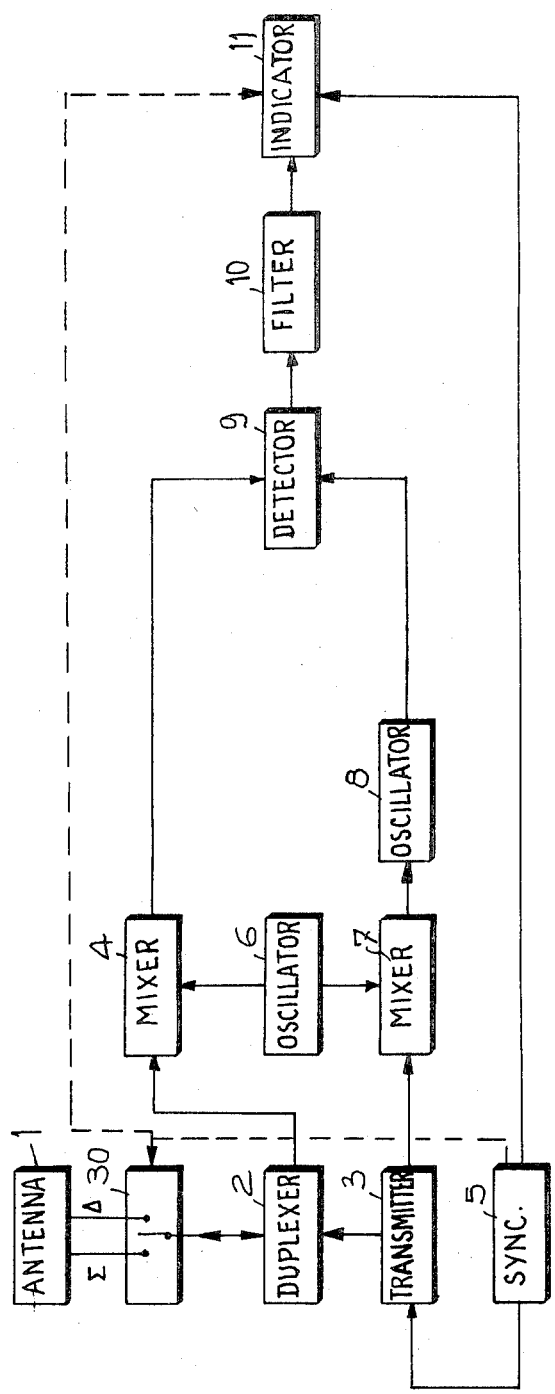
FIG. 3 shows a preferred embodiment of a radar system according to the invention combining the elimination of fixed echos with their visualisation.

The M.T.I. radar system according to the invention may also be used for the detection of fixed targets. To this end, as shown in FIG. 3, it is sufficient to provide between the duplexer 2 and the aerial 1 a switching system 30 which enables the aerial to be fed either through the sum channel or through the difference channel. Fixed targets are detected by using the sum channel for emission and reception, whilst moving targets are detected by using the difference channel as shown in FIG. 1. The dashed-line connection between the switch 30 and the indicator 11 is a reminder that the nature of the echos displayed on the indicator is governed by the position of the switch.

It has so far been assumed that the plane of symmetry of the beam was perpendicular to the direction of displacement of the airborne antenna relative to the ground or "ground speed". This is true if the drift angle $\delta$ or the angle between the heading of the aircraft and the flight path or true route is nil or negligible. It is also true for a non-neglible drift angle if the variation symmetry axis of the antenna is stabilized against drift.

The accuracy with which the radiation symmetry axis of the antenna should be maintained normal to the "ground velocity" vector of the aircraft is defined by the ratio between the power of the moving echos and the power of the fixed echos required to have suitable visibility.

In the absence of correction of the antenna, the frequency of the reference wave of the receiver has to be shifted as a function of the drift angle.

Figure 4:
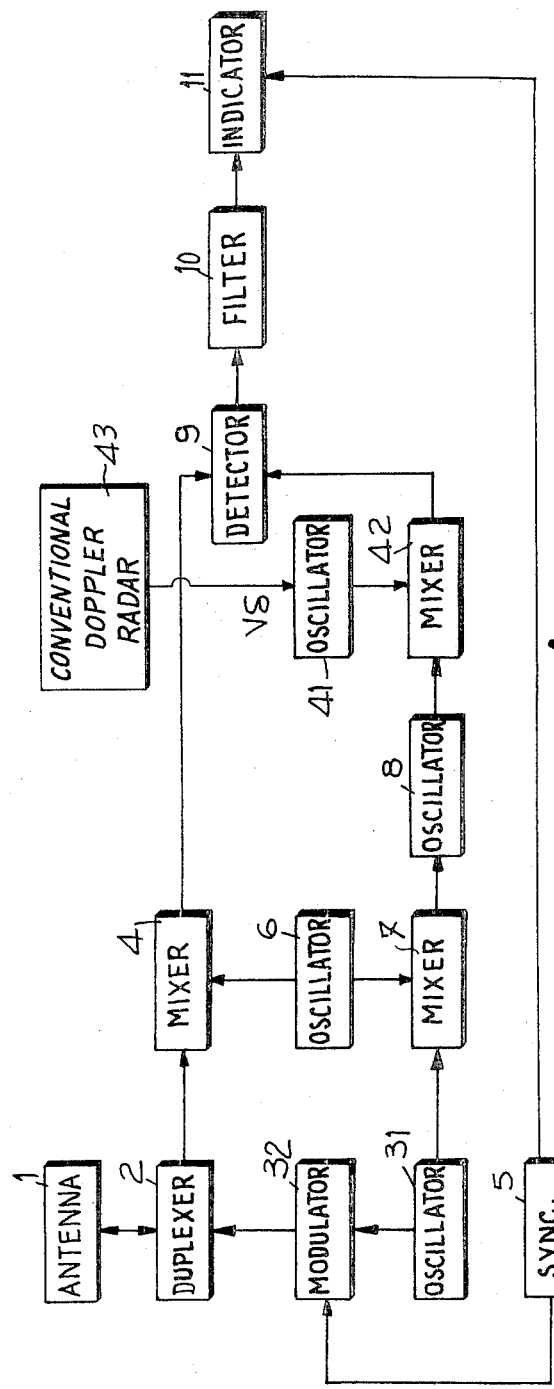
FIG. 4 shows by way of example modifications of part of the circuits shown in FIGS. 2 and 3.

FIG. 4 is an example of the radar systems according to the invention, including drift compensation.

In the installation shown in FIG. 4, a voltage V δ proportional to the drift angle is generated for example by another entirely conventional Doppler radar 43, used as a drift indicator. This voltage is applied to an oscillator 41 of the voltage-controlled type. A single side band modulator 42 receives the signals of the oscillators 8 and 41 and supplies the reference signal to the detector 9.

In FIG. 4 drift is compensated through the reference channel. Naturally, it would be possible in principle to compensate the drift at the output of the mixer 4, in which case the direction of frequency variation would be reversed.

Thus, if the reference frequency has to be increased by $f\delta$, the frequency of the signal will be reduced by $-f\delta$ and vice versa.

These compensating systems may of course be combined with the system shown in FIG. 3.

Naturally, the invention is not limited to the embodiments described and illustrated solely by way of example. In particular, the structure of the antenna, the circuits for elaborating the coherent oscillation, and the compensating circuit, may all be obtained in any other known manner, the essential feature being that the radiation pattern should have a zero radiation axis in a direction perpendicular to the projection on the ground of the trajectory of the radar system, and two maximum radiation axes symmetrical with respect to the system and not parallel to the tangent to the trajectory.

It will also be noted that the invention may be applied to pulse compression systems and in particular to those of the type comprising an optical processing as described in the U.S. patent application Ser. No. 781,885 filed on Dec. 6, 1968 now U.S. Pat. No. 3,569,967, relating to "Improvements in the echo processing apparatus of side-looking detection systems operating with frequency modulated transmitted pulses".

What we claim is:

1. A side looking airborne radar system, for exploring the space laterally with respect to the displacement direction of the aircraft, for producing information signals relative to targets moving with respect to the ground, comprising in combination:
   simultaneous lobing aerial means for producing a radiation pattern having two lobes with respective axes symmetrical with each other with respect to a plane which is substantially normal to said displacement direction and having a nil gain along said plane,
   transmitting means coupled to said aerial means for transmitting electromagnetic energy toward targets within said lobes, and
   receiving means coupled to said aerial means for receiving energy reflected from said targets within said lobes and including coherent detection means connected to said receiving means for receiving and detecting said received energy and low pass filtering means connected to said coherent detecting means for receiving the detected energy and for delivering said information signals corresponding to zero Doppler frequency received signals.

2. A system according to claim 1, comprising further aerial means having a radiation pattern comprising essentially a single main lobe symmetrical with respect to said plane and having a maximum gain along said plane, and switching means for coupling both the transmitting and receiving means to said simultaneous lobing aerial means and said further aerial means alternatively, for respectively detecting moving and stationary targets.

3. A system according to claim 2, wherein said simultaneous lobing aerial means and said further aerial means are formed of a single sum-difference aerial system of the monopulse type having a sum and a difference channel, and wherein further said switching means comprises a switching system for coupling the transmitting and receiving means alternately to said difference channel for moving targets indication and to said sum channel for stationary target indication.

4. A system according to claim 1 for operating aboard an aircraft including a drift indicator supplying a drift signal, wherein said coherent detection means comprises:
   a phase detector having a first input supplied by receiving signals at intermediate frequency, a second input supplied by a reference signal and an output, and further including indicating means connected in series to the output of said low pass filtering means, and
   generating means for supplying said reference signal and comprising:
   a first oscillator phase synchronized with the transmitting means, having an output,
   a second oscillator connected to said drift indicator having a frequency control input for receiving said drift signal and an output, and
   a mixer having two inputs respectively connected to the output of said first and second oscillator and an output connected to the second input of said phase detector.

* * * * *